US011010522B2

(12) United States Patent
Chen et al.

(10) Patent No.: US 11,010,522 B2
(45) Date of Patent: May 18, 2021

(54) EFFICIENT MECHANISM FOR INTERACTIVE FAULT ANALYSIS IN FORMAL VERIFICATION ENVIRONMENT

(71) Applicant: Synopsys, Inc., Mountain View, CA (US)

(72) Inventors: Xiaolin Chen, San Jose, CA (US); Arunava Saha, Mountain View, CA (US); Sandeep Jana, Karnataka (IN); Pratik Mahajan, Cupertino, CA (US); Jinnan Huang, Shanghai (CN)

(73) Assignee: Synopsys, Inc., Mountain View, CA (US)

( * ) Notice: Subject to any disclaimer, the term of this patent is extended or adjusted under 35 U.S.C. 154(b) by 3 days.

(21) Appl. No.: 16/191,241

(22) Filed: Nov. 14, 2018

(65) Prior Publication Data

US 2019/0147121 A1    May 16, 2019

(51) Int. Cl.
*G06F 30/3323* (2020.01)
*G06F 30/30* (2020.01)
*G06F 30/327* (2020.01)
*G06F 111/04* (2020.01)
*G06F 111/20* (2020.01)

(52) U.S. Cl.
CPC .......... *G06F 30/3323* (2020.01); *G06F 30/30* (2020.01); *G06F 30/327* (2020.01); *G06F 2111/04* (2020.01); *G06F 2111/20* (2020.01)

(58) Field of Classification Search
USPC ....................................................... 716/102
See application file for complete search history.

(56) References Cited

U.S. PATENT DOCUMENTS

| 8,990,746 | B1 | 3/2015 | Goyal et al. | |
|---|---|---|---|---|
| 2005/0262457 | A1* | 11/2005 | Granier | G06F 30/3323 703/2 |
| 2007/0050740 | A1* | 3/2007 | Jacobi | G06F 30/3323 716/103 |
| 2007/0226663 | A1* | 9/2007 | Bormann | G06F 30/398 716/106 |
| 2014/0046647 | A1 | 2/2014 | Tsai et al. | |
| 2014/0089872 | A1* | 3/2014 | Galpin | G06F 30/3323 716/102 |

(Continued)

OTHER PUBLICATIONS

Darbari, A. et al., "A Novel Transient Fault Injection Methodology Based on STE Model Checking," ARM, 2008, 7 pages.

(Continued)

*Primary Examiner* — Mohammed Alam
(74) *Attorney, Agent, or Firm* — Fenwick & West LLP

(57) ABSTRACT

In one aspect, a fault injection environment and a formal property verification environment are combined in a single integrated flow that allows the user to go back and forth between the two tasks. A system that unifies formal property verification and fault injection includes user interfaces that support the unified use model. In one approach, the FPV tool is the master and its user interface is the primary interface for the user to set up, run and debug faults as well as checkers. This interface allows the user to interactively select the FPV properties and/or the faults to be used for fault analysis. The user interface may provide a view of the faults, for example by listing faults or summarizing faults by class, type, etc.

20 Claims, 9 Drawing Sheets

(56) References Cited

U.S. PATENT DOCUMENTS

| | | | |
|---|---|---|---|
| 2014/0317584 A1* | 10/2014 | Busch | G06F 30/3323 |
| | | | 716/107 |
| 2015/0161306 A1 | 6/2015 | Smith et al. | |
| 2015/0213167 A1 | 7/2015 | Jain et al. | |
| 2015/0254383 A1 | 9/2015 | Tso-Sheng et al. | |
| 2018/0349521 A1 | 12/2018 | Jana et al. | |
| 2019/0147121 A1* | 5/2019 | Chen | G06F 30/30 |
| | | | 716/102 |

OTHER PUBLICATIONS

Darbari, A. et al., "A New Approach for Transient Fault Injection Using Symbolic Simulation," IEEE, 2008, 7 pages.

Pattabiraman, K. et al., "SymPLFIED: Symbolic Program Level Fault Injection and Error Detection Framework," IEEE, 2013, pp. 1-15.

* cited by examiner

EFFICIENT MECHANISM FOR INTERACTIVE FAULT ANALYSIS IN FORMAL VERIFICATION ENVIRONMENT

CROSS-REFERENCE TO RELATED APPLICATION(S)

This application claims priority to Indian Provisional Patent Application Serial No. 201741040626, "Efficient Mechanism for Interactive Fault Analysis in Formal Functional Verification Environment," filed Nov. 14, 2017. The subject matter of all of the foregoing is incorporated herein by reference in their entirety.

BACKGROUND

1. Technical Field

This disclosure relates to formal property verification and fault analysis.

2. Description of Related Art

An important problem in doing signoff with formal property verification for integrated circuit designs is to understand if the formal test bench is adequate to cover the design functionality. In other words, if the circuit design has a bug, will the existing properties in the formal test bench catch it? If not, then that would indicate a weakness in the formal verification environment.

Functional fault coverage technology can be used to measure the coverage of the testbench. There are fault injection tools, such as Certitude, which are capable of systematically injecting behavioral faults (i.e., bugs) into the integrated circuit design. The formal property verification (FPV) tool can then be run on the fault-injected design to determine if the formal verification environment can detect the injected faults. Typically, the flow is to run all proven (sometimes bounded proven as well) formal properties in the original design with one fault activated at a time to see if this fault can be detected because it results in falsification of one of the properties. If not, the fault is non-detected. The non-detected faults can help identify design logic where faults are not caught by any of the existing formal property verification checkers. This helps to quantify the quality of the FPV environment. If all the checkers pass in the presence of a fault, it indicates weakness in the FPV environment, possibly missing a formal property checker, incomplete specification or over-constraining. It provides guidance for further examination of the environment, for example, to add a missing formal property checker to catch the injected bug.

Typically in this approach, the fault injection tool acts as the master. It qualifies one single fault by calling the FPV tool running in batch mode with all previously passing formal property checkers. The fault injection tool repeats this process for every fault to be qualified. However, qualifying one fault at a time can take too much time and compute resources and can be too inefficient to be practical.

In addition, the reporting and debugging are done solely in the user interface of the fault injection tool. There typically is no connection to the user interface of the FPV tool. This can cause a major usability problem. The user uses the fault injection tool to uncover a non-detected fault. However, there is no way to directly interact with the formal verification environment to do further debug analysis and correction, such as exploring why this fault was not detected by the existing formal verification checkers, allowing easy addition of missing checkers and incrementally verifying in the fault injection tool environment to see if the fault is now detected by the newly added checker.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIG. 6A is a screen shot of a table listing FPV properties.

FIG. 6B is a screen shot of the table in FIG. 6A, where FPV properties that can detect a fault are highlighted.

FIG. 7 is a screen shot of the tables in FIG. 4, showing live run status update.

FIG. 8 is a screen shot of a source view showing color coding based on fault status.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

In one aspect, the fault injection environment and the formal property verification environment are combined in a single integrated flow that allows the user to go back and forth between the two tasks. A system that unifies formal property verification and fault injection includes user interfaces that support the unified use model.

In one approach, the FPV tool is the master and its user interface is the primary interface for the user to set up, run and debug faults as well as checkers. This interface allows the user to interactively select the FPV properties to be used for fault analysis. It also provides interactive control to allow the user to configure the fault analysis such as selecting and/or deselecting (enabling and/or disabling) different classes of faults, different types of faults, or even down to individual faults. The fault-aspect of the user interface provides a view of the faults, for example by listing faults or summarizing faults by class, type, etc. It may also be updated to indicate progress of formal verification.

With this unified system, the user can more easily do cross probing to visualize the relationship of a fault to a set of checkers, and also the reverse relationship of how a checker is related to a set of faults. This reduces turnaround time significantly to:
1) Identify the cause of a fault not being detected
2) Followed by interactively modifying the formal environment, such as editing or adding checkers, reviewing specifications, etc.
3) Restart the fault analysis using the modified formal environment.

Figure 1:
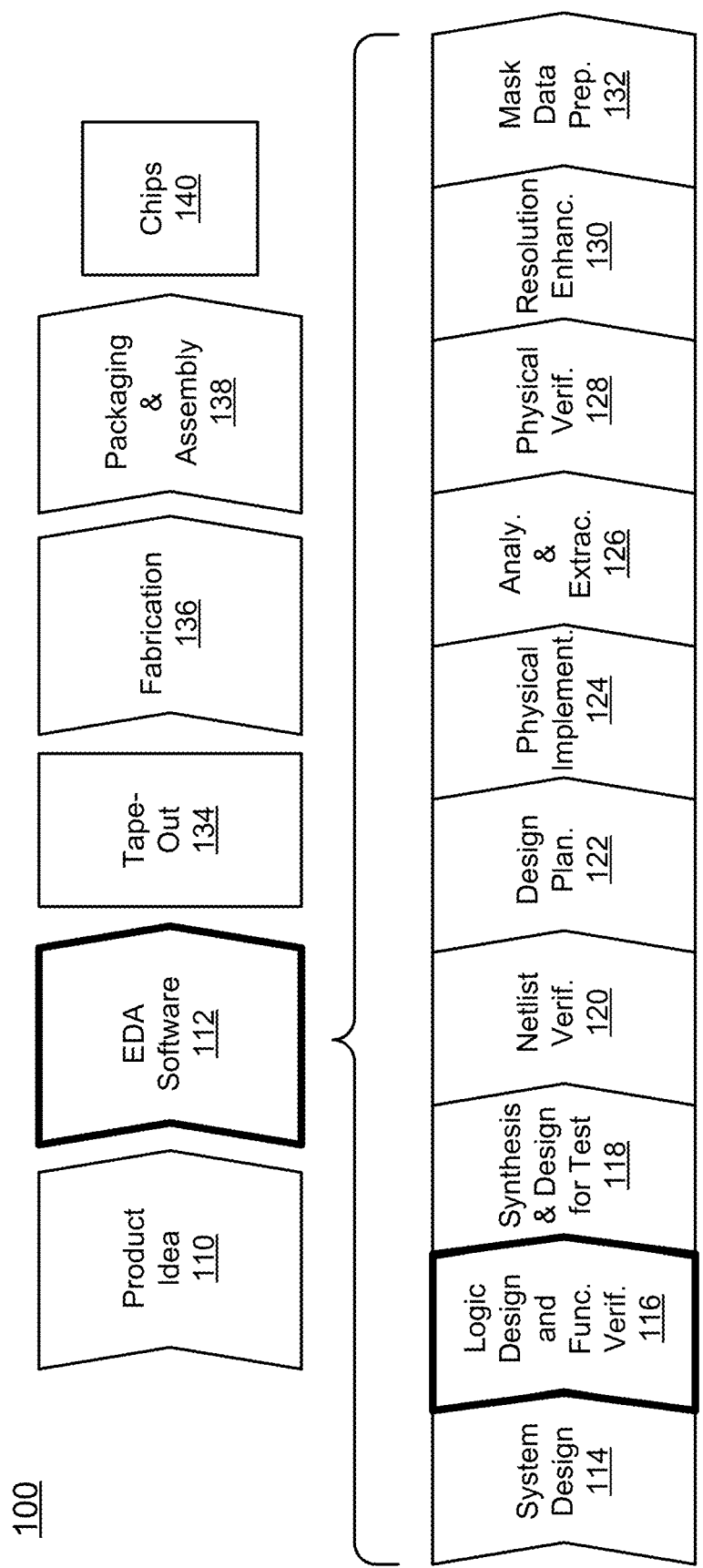
FIG. 1 is a flow diagram illustrating various operations in the design and fabrication of an integrated circuit.

For context, FIG. 1 illustrates various processes performed in the design and fabrication of an integrated circuit using software tools with a computer to transform data and instructions that represent the integrated circuit. These processes start with the generation of a product idea 110 with information supplied by a designer and is realized during a design process that uses EDA software tools 112, which may also be signified herein as EDA software, as a design tool or a verification tool. When the design is finalized, it can be taped-out 134. After tape-out, a semiconductor die is fabricated 136 and packaging and assembly processes 138 are performed, which result in the finished integrated circuit 140 which may also be signified herein as a circuit, device, component, chip or SoC (system on chip).

Note that the design process that uses EDA software tools 112 includes operations 114-132, which are described below. This design flow description is for illustration purposes only and is not meant to limit the present disclosure. For example, an actual integrated circuit design may require a designer to perform the design operations in a different sequence than the sequence described herein.

During system design 114, a designer describes the functionality to be manufactured. The designer can also perform what-if planning to refine the functionality and to check costs. Note that hardware-software architecture partitioning can occur at this stage. Exemplary EDA software products from Synopsys, Inc. of Mountain View, Calif. that can be used at this stage include: Model Architect, Saber, System Studio, and Designware products.

Then, during logic design and functional verification 116, VHDL or Verilog code for modules in the circuit is written and the design is checked for functional accuracy. More specifically, the design is checked to ensure that it produces the correct outputs. The VHDL or Verilog code is software comprising optimized readable program instructions adapted for the efficient description of a logic design. Exemplary EDA software products from Synopsys, Inc. of Mountain View, Calif. that can be used at this stage include: VCS, Vera, Designware, Magellan, Formality, ESP and Leda products.

Next, during synthesis and design for test 118, VHDL/Verilog code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include: Design Compiler, Physical Compiler, Test Compiler, Power Compiler, FPGA Compiler, Tetramax, and Designware products.

Moreover, during netlist verification 120, the netlist is checked for compliance with timing constraints and for correspondence with the VHDL/Verilog code. Exemplary EDA software products from Synopsys, Inc. of Mountain View, Calif. that can be used at this stage include: Formality, Primetime, and VCS products.

Furthermore, during design planning 122, an overall floor plan for the integrated circuit is constructed and analyzed for timing and top-level routing. Exemplary EDA software products from Synopsys, Inc. of Mountain View, Calif. that can be used at this stage include: Astro and IC Compiler products.

Additionally, during physical implementation 124, the placement positioning of circuit elements such as transistors or capacitors and routing connection of the same by a plurality of conductors occurs. Exemplary EDA software products from Synopsys, Inc. of Mountain View, Calif. that can be used at this stage include: the Astro and IC Compiler products.

Then, during analysis and extraction 126, the circuit function is verified at a transistor level, which permits refinement of the logic design. Exemplary EDA software products from Synopsys, Inc. of Mountain View, Calif. that can be used at this stage include: Astrorail, Primerail, Primetime, and Star RC/XT products.

Next, during physical verification 128, the design is checked to ensure correctness for manufacturing issues, electrical issues, lithographic issues, and circuitry. Exemplary EDA software products from Synopsys, Inc. of Mountain View, Calif. that can be used at this stage include the Hercules product.

Moreover, during resolution enhancement 130, geometric manipulations of the layout are performed to improve manufacturability of the design. Exemplary EDA software products from Synopsys, Inc. of Mountain View, Calif. that can be used at this stage include: Proteus, Proteus, and PSMGED products.

Additionally, during mask-data preparation 132, the 'tape-out' data for production of masks to produce finished integrated circuits is provided. Exemplary EDA software products from Synopsys, Inc. of Mountain View, Calif. that can be used at this stage include the Cats. family of products.

For all of the above mentioned integrated circuit design tools, similar tools from other EDA vendors, such as Cadence and Mentor Graphics, can be used as an alternative. Additionally, similarly non-commercial tools available from universities can be used.

A storage subsystem is preferably used to store the basic programming and data constructs that provide the functionality of some or all of the EDA tools described herein, and tools applied for development of cells for the library and for physical and logical design using the library. These software modules are generally executed by one or more processors in a manner known to those of ordinary skill in the art.

Embodiments of the present disclosure can be used during one or more of the above-described stages. Specifically, some embodiments of the present disclosure can be used in EDA software 112 as a part of logic design and functional verification 116.

One type of functional verification 116 is formal verification. In formal verification, the functionality of a design of an integrated circuit is tested or verified using formal proofs. The formal verification environment includes a number of properties (e.g., user assertions), which are used to validate the functionality of the circuit design. For clarity, the properties used to validate the functionality of the circuit design will be referred to as formal property verification properties or FPV properties for short. Known methods (or checkers) are used to prove or disprove the FPV properties, thus indicating whether the circuit design has the correct functionality.

One aspect of formal verification is determining whether the FPV properties are adequate for testing the functionality of the integrated circuit design. Will the FPV properties catch all bugs in the integrated circuit design? One approach is to intentionally inject bugs (faults) into the integrated circuit design and then run the formal verification environment and observe whether the FPV properties detect the injected faults. If some injected faults are not detected, then there is a hole in the coverage of the FPV properties.

A solution to automate the modelling of the fault analysis problem for formal verification is to create additional properties (referred to as fault properties to distinguish them from the FPV properties) based on the injected faults (e.g., fault enable signals). A unified architecture integrates the functionality and user interface of a traditional fault injection tool into the FPV tool. This provides more seamless interaction between the two.

Figure 2A:
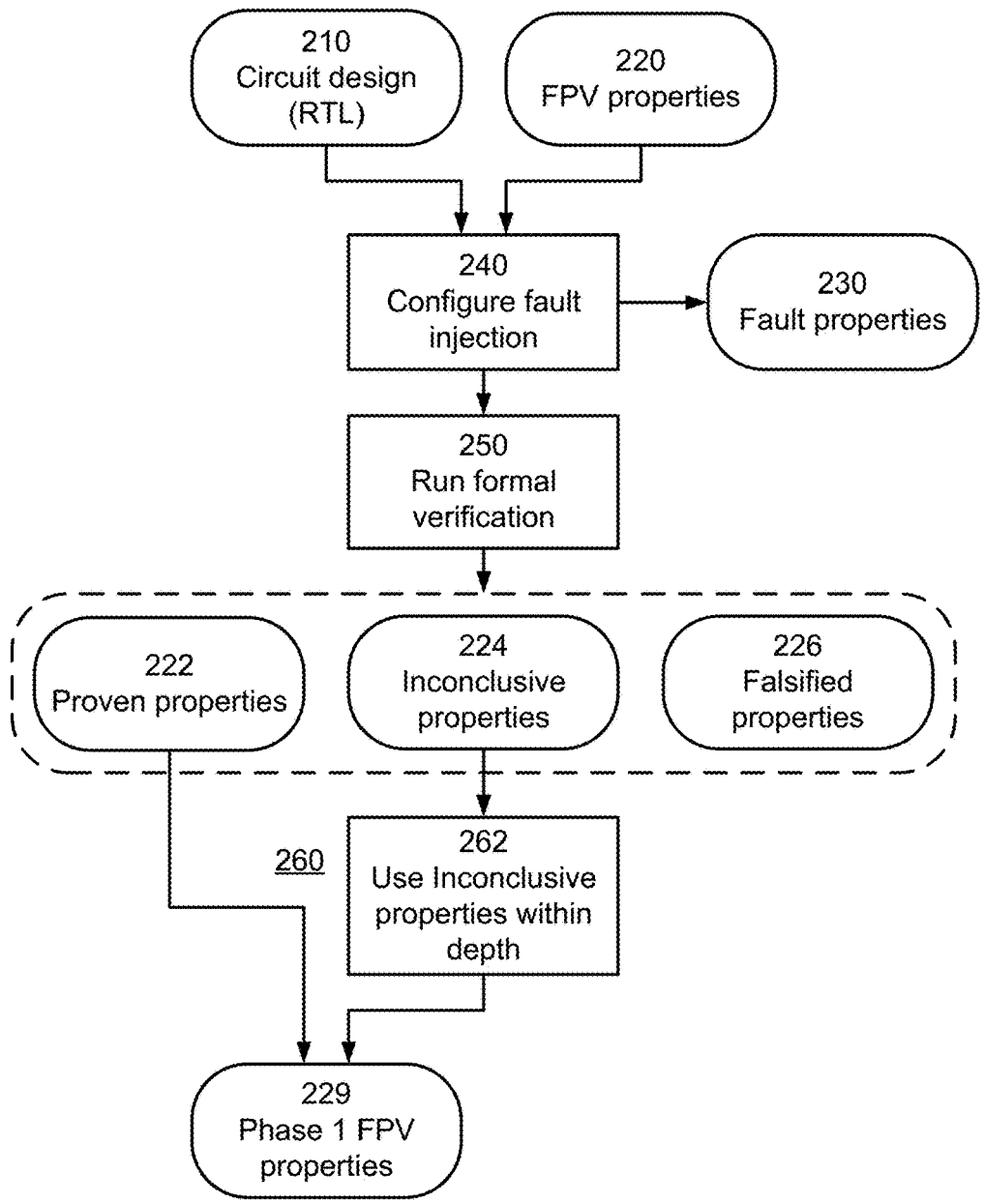
FIG. 2A is a flow diagram illustrating the generation of FPV properties and fault properties for a unified formal property verification and fault injection system.
Figure 3:
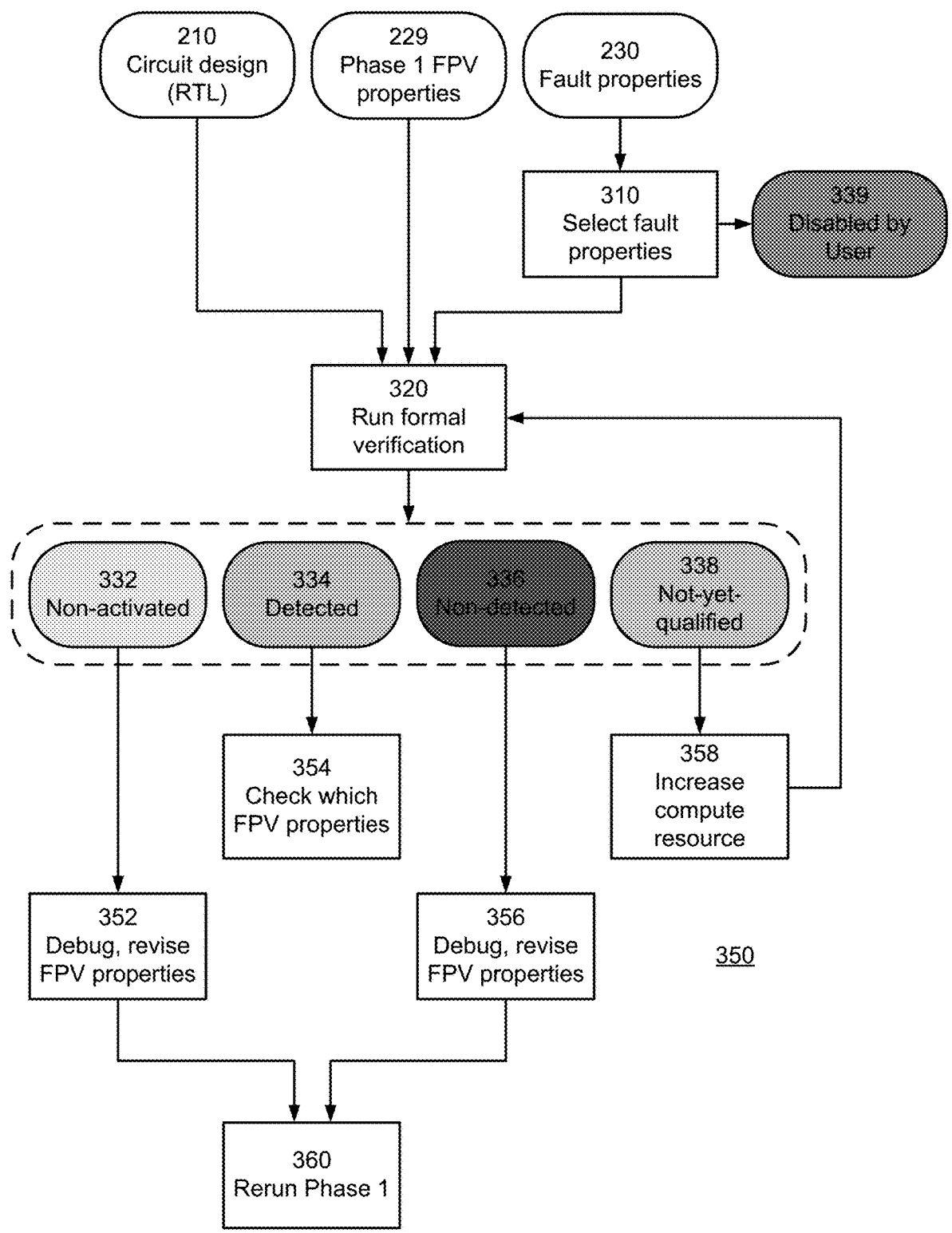
FIG. 3 is a flow diagram illustrating the operation of a unified formal property verification and fault injection system.

FIG. 2A is a flow diagram illustrating the generation of FPV properties and fault properties for a unified formal property verification and fault injection system. FIG. 3 is a flow diagram illustrating the operation of a unified formal property verification and fault injection system.

Phase 1

In Phase 1 (FIG. 2), the unified system runs formal verification on a circuit design 210 to classify FPV properties 220 for Phase 2 (FIG. 3). It also automatically generates fault properties 230 for use in Phase 2.

A data store stores a circuit design 210, for example RTL describing a design under test. It also stores formal property verification (FPV) properties 220 for formally verifying functionality of the circuit design 210.

Step 240: Read Circuit Design and Configure Fault Injection Tool

After reading in the circuit design 210 and FPV properties 220, a fault injection tool injects faults into the circuit design. These are tracked in the formal verification environment as fault properties 230, which are automatically generated by the fault injection tool. The injected faults can be used to evaluate the efficiency and completeness of the FPV properties.

Step 250: Run Formal Verification on FPV Properties

The user runs formal verification on the circuit design 210 using the FPV properties 220. In one approach, the terminal status of the FPV properties can be:

Proven 222 (always correct in original circuit design)
Falsified 224 (fail in at least one scenario)
Inconclusive 226 (could not be proven or falsified in the given compute resource, but might have been proven up to certain clock depth or clock cycles).

Step 260: Generate FPV Property List

Figure 2B:
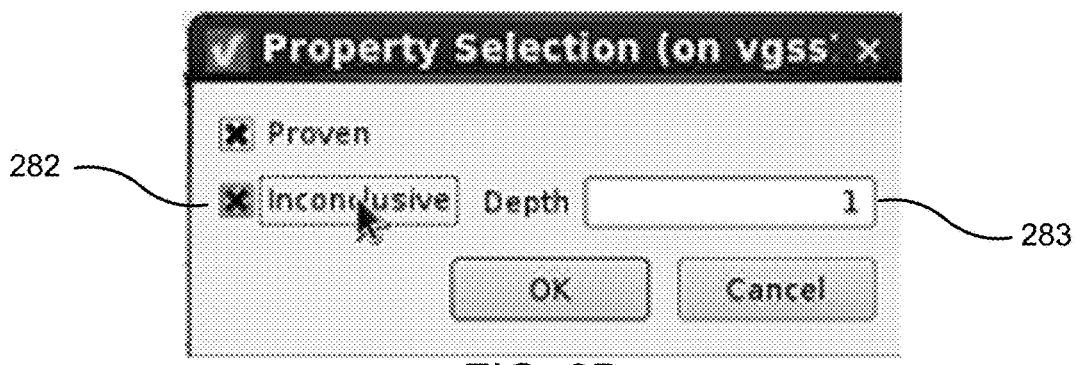
FIG. 2B is a screen shot of a dialog box that allows the user to select FPV properties.

The Proven FPV properties 222 can be used for Phase 2, so that if a Proven FPV property becomes falsified in the fault-injected design, it means that the testbench can detect this fault. The Inconclusive FPV properties 224 may also be used 262 within the depth for which the Inconclusive properties were proven. FIG. 2B is a user interface example that allows the user to set the depth for Inconclusive FPV properties. Checking box 282 indicates that Inclusive FPV properties will be used, with the user-specified depth entered in box 283. In one approach, Falsified FPV properties 226 are not used in Phase 2. The result of step 260 is a set 229 of FPV properties that are used in Phase 2.

Phase 2

In Phase 2 (FIG. 3), the unified system provides the user with flexibility and tools to analyze and correct fault coverage. A data store includes the circuit design 210, the FPV properties 229 selected in Phase 1, and the fault properties 230 generated in Phase 1.

Step 310: Review and Select Fault Properties

Figure 4:
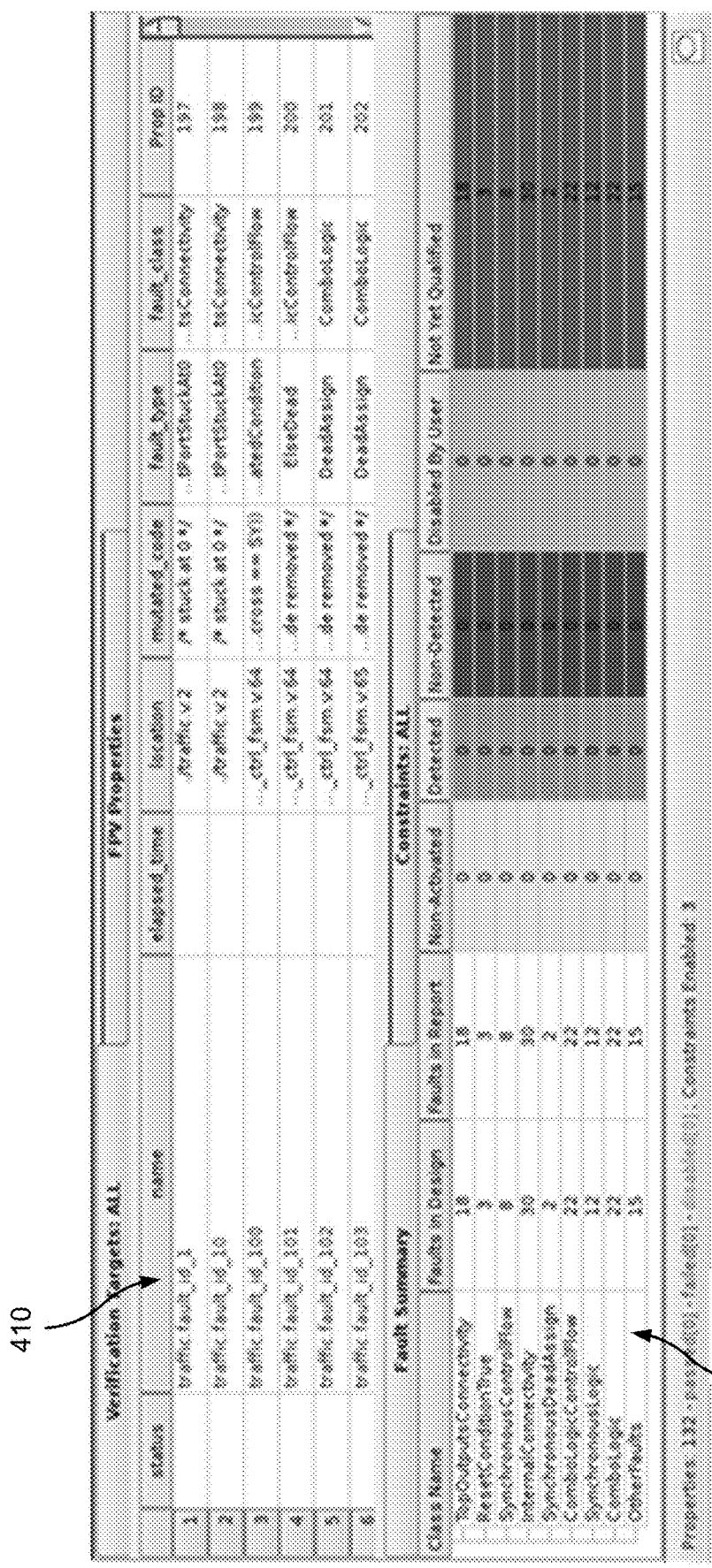
FIG. 4 is a screen shot of a table listing faults and a summary view of faults.

The unified system provides a user interface to allow the user to review and select 310 fault properties. In the example of FIG. 4, the fault properties are listed in a table 410. Each row in table 410 represents a fault property for a corresponding injected fault. The right five columns in the table are the source location of the injection (location), the mutated code (mutated_code), the fault type (fault_type) which is a subdivision of fault class, the fault class (fault_class), and an index for the fault property (Prop ID).

A fault summary view 420 lists the faults by fault classes. Each column lists the number of faults of that type that falls within that status. The different detection statuses are described below. Double clicking the number shows the user the detailed list of fault properties for that cell.

Figure 5:
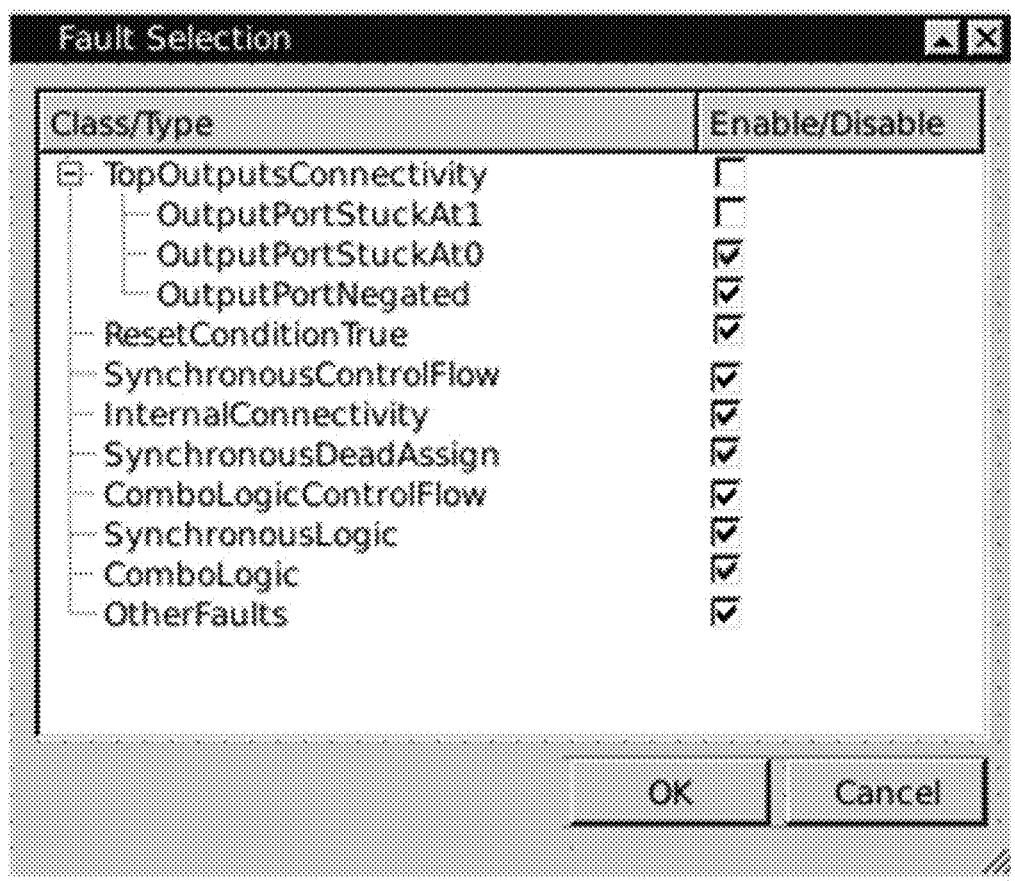
FIG. 5 is a screen shot of a dialog box that allows the user to select faults by class and type.

The user can select and/or deselect faults using various interfaces. As one example, the user can select by the fault classes listed in the fault summary view 420, as well as by the fault types under each fault class. FIG. 5 is a screen shot of a dialog box that allows the user to select faults by class and type. Users can also enable/disable individual fault properties listed in the fault property table 410. Selecting a fault property in this table 410 will also link to view the mutated source code.

Figures 6A, 6B:
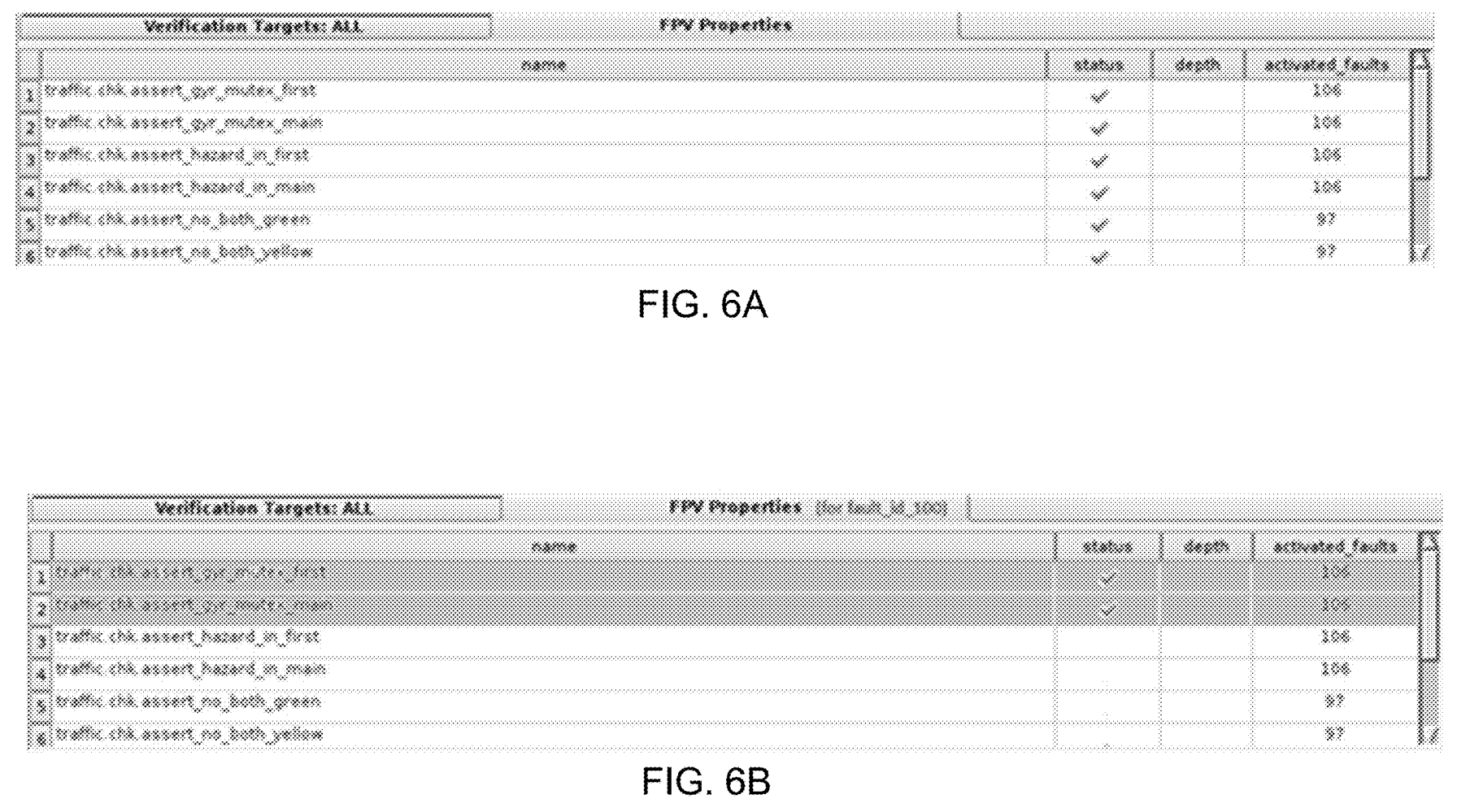

Users can also review the FPV properties as shown in the tables of FIGS. 6A and 6B. IN FIG. 6A, activated_faults is the number of faults that each FPV property can cover structurally and functionally. User can also double click on the number to see the detailed list of fault properties covered by that FPV property. Additionally, users can select a fault property from the fault property table 410, to view the list of FPV properties which can potentially cover that fault.

After formal fault qualification analysis is finished. the FPV property or properties that can detect the fault are highlighted, as shown in the example of FIG. 6B.

Step 320: Use the FPV Properties to Check the Selected Fault Properties

Figure 7:
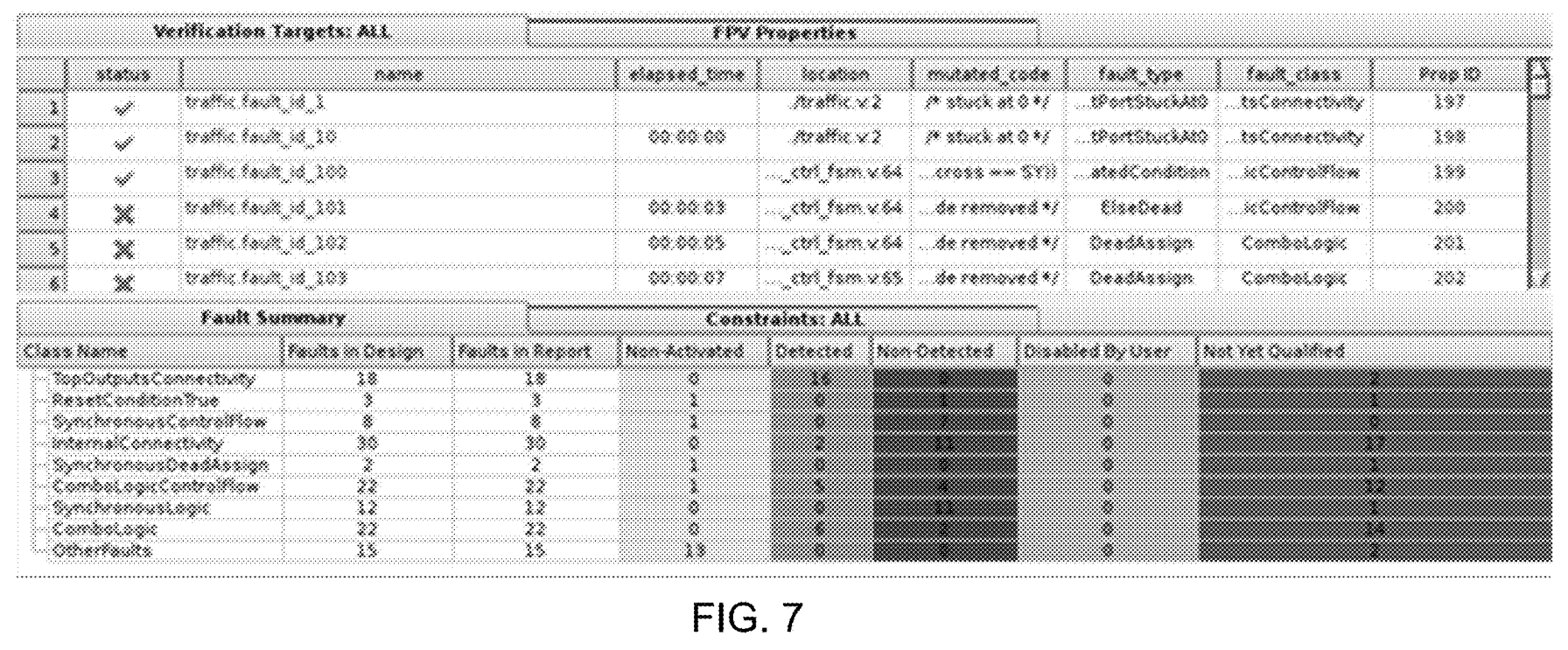

After review and fault selection 310 are done, the user runs formal verification 320 on the selected fault properties to determine whether the FPV properties cover the selected faults. As the run progresses, the fault property table and fault summary table show live run status update, as shown in FIG. 7.

In one approach, the formal verification 320 classifies the injected faults (or corresponding fault properties) into the following statuses:

Non-activated 332 (not structurally covered by any FPV property)
Detected 334 (at least one FPV property is falsified, which means the testbench can catch this error)
Non-detected 336 (no FPV property can catch this error)
Not-yet-qualified 338 (did not reach terminal status due to compute resource limitation).

The fault properties disabled (i.e., not selected) during fault configuration 310 may be listed as Disabled-by-user 339. In FIG. 7, double clicking each number shows the detailed list of fault properties in that cell.

User can also filter the fault property table, for example to review the Non-detected fault properties and Non-activated fault properties. Making these fault properties Detected can improve the testbench efficiency.

Step 350: Debug Fault Properties

The unified system provides user interfaces to assist the user to analyze and debug based on the fault coverage results of the formal verification. This is an improvement over traditional approaches in which the fault injection tool is separate from the FPV tool, so that it is difficult to switch between the two contexts. As an example in the unified system, to debug a fault, the user may start from the fault summary table. The faults in the summary table are linked to the fault property table.

The fault property table contains information such as:
fault class
fault type
fault location
the mutated code
link to injected fault in the source view Users can also move the cursor over each fault property name to see the detail of that fault. The fault property name is linked to the source view.

Figure 8:
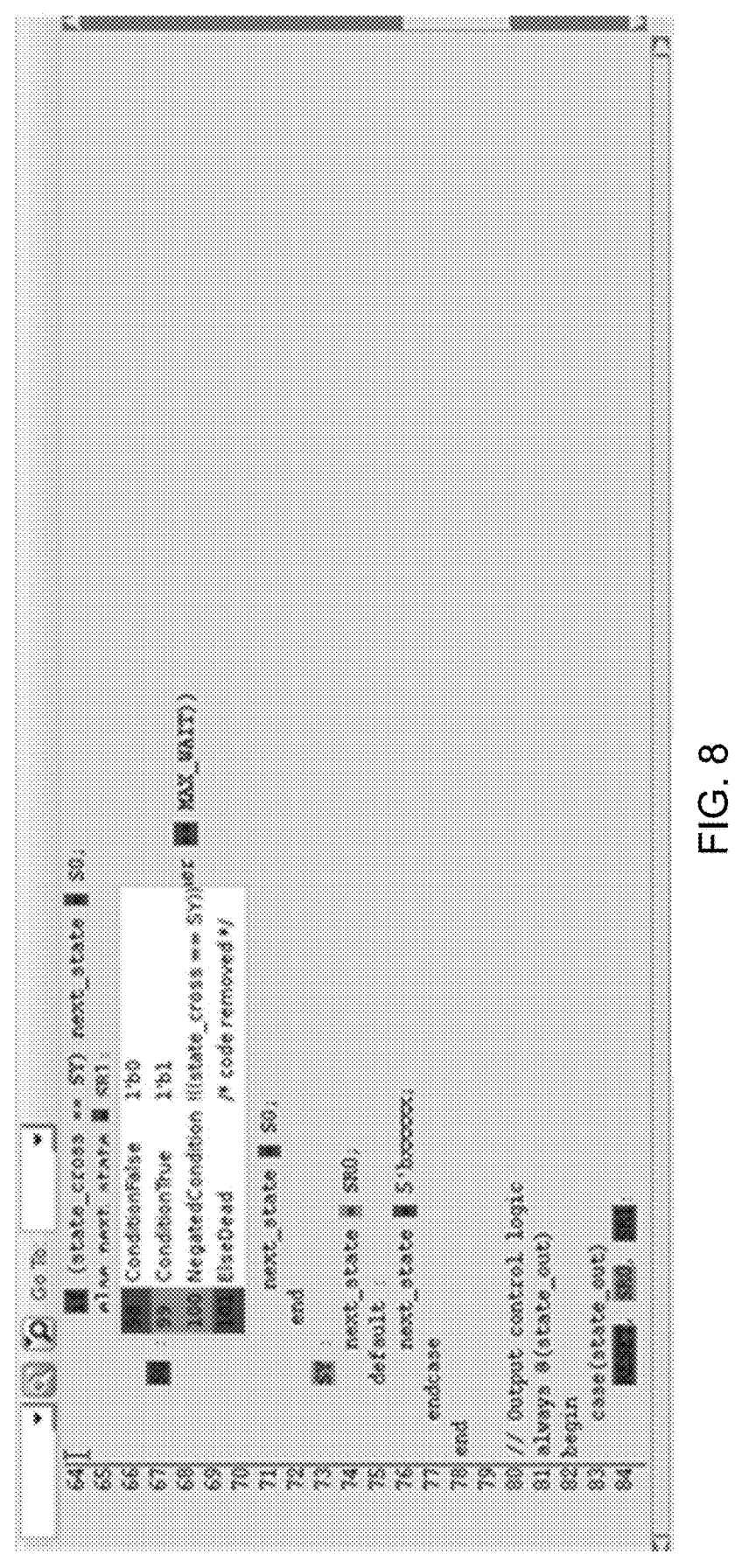

In the source view, the code is attributed with colored highlight with mutation type and mutated error code, as shown in FIG. 8. The highlight colors are based on fault status. They match the colors used in the fault summary table for easy identification. If the highlighted source code has multiple faults injected, the color scheme is decided by the order of severity status:

1. Non-detected (red)
2. Non-activated (yellow)
3. Detected (green)
4. Not Yet Qualified (gray)

See also FIGS. 3 and 7 which use this same color code.

Referring to FIG. 3, when a fault property is Detected 334, users might also want to drill down into which FPV properties can detect this fault. The user interface can provide 354 the list to the user.

When a fault property is Non-activated 332, it means the fault could not be structurally covered by the current FPV property list (not in the logic fan-in cone of any FPV property). Users can review the source code and the FPV properties and determine whether to add more or edit 352 the existing FPV properties. After modification to the functional verification environment, the functional and fault analysis may be rerun 360 on an incremental change basis.

When a fault property is Non-detected 336, it means the fault-impacted signal can be covered by the current FPV property list, but the checker property could not detect this fault. User can review the source code and the FPV properties and determine whether to add more or edit 356 the existing FPV properties. As part of debug 356, it may be useful to view source or waveforms in order to debug Non-detected faults. After modification to the functional verification environment, the functional and fault analysis may be rerun 360 on an incremental change basis.

When a fault property is Not-yet-qualified 338, users can increase 358 the compute resource to make the checker finish the run for the fault properties.

Users may also choose to waive selected faults for signoff.

The formal verification 320 to check fault properties and the subsequent debugging 350 preferably occurs in a single user session. This way, the unified system provides transparency of the relationship between each fault and related FPV properties, and between each FPV property and related injected faults. The visibility makes debugging much more efficient. Not only can the user clearly see which FPV properties are related to any Non-detected fault, but also how similar faults near the same design code to the Non-detected fault are related to which set of the FPV properties and if any of the FPV properties becomes falsified due to presence of this fault. This relevancy reduces the time required to analyze deficiency in the formal functional verification environment.

Figure 9:
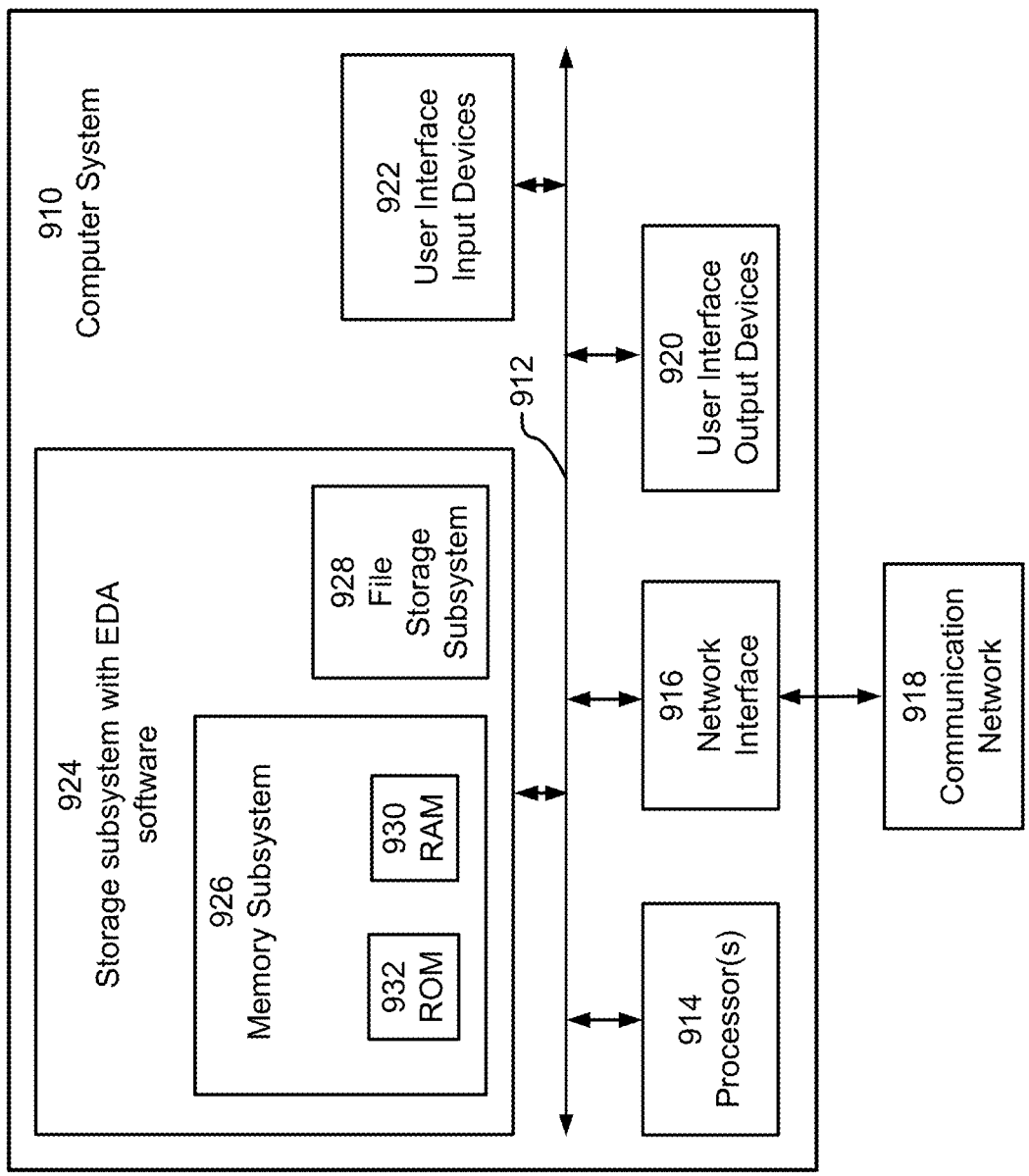
FIG. 9 is a block diagram of one embodiment of a computer system that may be used with the present invention.

FIG. 9 is a block diagram of one embodiment of a computer system 910 that may be used with the present invention. The computer system 910 typically includes at least one computer or processor 914 which communicates with a number of peripheral devices via bus subsystem 912. Typically, the computer can include, or the processor can be, any of a microprocessor, graphics processing unit, or digital signal processor, and their electronic processing equivalents, such as an Application Specific Integrated Circuit (ASIC) or Field Programmable Gate Array (FPGA). The terms "processor" and "computer" are further defined below. These peripheral devices may include a storage subsystem 924, comprising a memory subsystem 926 and a file storage subsystem 928, user interface input devices 922, user interface output devices 920, and a network interface subsystem 916. The input and output devices allow user interaction with computer system 910.

The computer system may be a server computer, a client computer, a workstation, a mainframe, a personal computer (PC), a tablet PC, a rack-mounted "blade" or any data processing machine capable of executing instructions (sequential or otherwise) that specify actions to be taken by that machine.

The computer system typically includes an operating system, such as Microsoft's Windows, Sun Microsystems's Solaris, Apple Computer's MacOs, Linux or Unix. The computer system also typically can include a Basic Input/Output System (BIOS) and processor firmware. The operating system, BIOS and firmware are used by the processor to control subsystems and interfaces connected to the processor. Typical processors compatible with these operating systems include the Pentium and Itanium from Intel, the Opteron and Athlon from Advanced Micro Devices, and the ARM processor from ARM Holdings.

Innovations, embodiments and/or examples of the claimed inventions are neither limited to conventional computer applications nor the programmable apparatus that run them. For example, the innovations, embodiments and/or examples of what is claimed can include an optical computer, quantum computer, analog computer, or the like. The computer system may be a multi-processor or multi-core system and may use or be implemented in a distributed or remote system. The term "processor" here is used in the broadest sense to include a singular processor and multi-core or multi-processor arrays, including graphic processing units, digital signal processors, digital processors and combinations of these devices. Further, while only a single computer system or a single machine may be illustrated, the use of a singular form of such terms shall also signify any collection of computer systems or machines that individually or jointly execute instructions to perform any one or more of the operations discussed herein. Due to the ever-changing nature of computers and networks, the description of computer system 910 depicted in FIG. 9 is intended only as one example for purposes of illustrating the preferred embodiments. Many other configurations of computer system 910 are possible having more or less components than the computer system depicted in FIG. 9.

Network interface subsystem 916 provides an interface to outside networks, including an interface to communication network 918, and is coupled via communication network 918 to corresponding interface devices in other computer systems or machines. Communication network 918 may comprise many interconnected computer systems, machines and communication links. These communication links may be wireline links, optical links, wireless links, or any other devices for communication of information. Communication network 918 can be any suitable computer network, for example a wide area network such as the Internet, and/or a local area network such as Ethernet. The communication network can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

User interface input devices 922 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term "input device" is intended to include all possible types of devices and ways to input information into computer system 910 or onto communication network 918. User interface input devices typically allow a user to select objects, icons, text and the like that appear on some types of user interface output devices, for example, a display subsystem.

User interface output devices 920 may include a display subsystem, a printer, or non-visual displays such as audio output devices. The display subsystem may include a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from computer system 910 to the user or to another machine or computer system.

Memory subsystem 926 typically includes a number of memories including a main random-access memory (RAM) 930 (or other volatile storage device) for storage of instructions and data during program execution and a read only memory (ROM) 932 in which fixed instructions are stored. File storage subsystem 928 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 928.

Bus subsystem 912 provides a device for letting the various components and subsystems of computer system 910 communicate with each other as intended. Although bus subsystem 912 is shown schematically as a single bus, alternative embodiments of the bus subsystem may use multiple busses. For example, RAM-based main memory can communicate directly with file storage systems using Direct Memory Access (DMA) systems.

As used herein, the term "module" signifies a tangible data and information processing device, that typically is limited in size and/or complexity. For example, the term "module" can signify one or more methods or procedures that can transform data and information. The term "module" can also signify a combination of one or more methods and procedures in a computer program. The term "module" can also signify a small network of digital logic devices, in which interconnections of the logic devices give structure to the network. Methods and procedures comprising a module, specified in a specialized language, such as System C, can be used to generate a specification for a network of digital logic devices that process data and information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs—for example, sold by Xilink or Inters Altera), Random Access Memories (RAMs) or microprocessors. A module is configured to process data and information, typically using a sequence transformations (also referred to as "operations") applied to the data and information (or in the case of ROMs and RAMS, transforming data and information by using the input information as an address for memory that stores output data and information), to perform aspects of the present innovations, embodiments and/or examples of the invention.

Modules that are temporarily configured need not be configured at any one instance in time. For example, a processor comprising one or more modules can have the modules configured at different times. The processor can comprise a set of one or more modules at one instance of time, and to comprise a different set of one or modules at a different instance of time. The decision to manufacture or implement a module in a permanently configured form, a temporarily configured form, or a combination of the two forms, may be driven by cost, time considerations, engineering constraints and/or specific design goals. The "substance" of a module's processing is independent of the form in which it is manufactured or implemented.

As used herein, the term "algorithm" signifies a process comprising a sequence or set of operations or instructions that a module can use to transform data and information to achieve a result. A module can comprise one or more algorithms. As used herein, the term "thread" refers to a sequence of instructions that can comprise a subset of the instructions of an entire process or algorithm. A process or algorithm can be partitioned into multiple threads that can be executed in parallel.

As used herein, the term "computer" includes at least one information processor that, for example, can perform certain operations such as (but not limited to) the AND, OR and NOT logical operations using electronic gates that can comprise transistors, with the addition of memory (for example, memory based on flip-flops using the NOT-AND or NOT-OR operation). Such a processor is said to be Turing-complete or computationally universal. A computer, whether or not it is a digital computer, typically comprises many modules.

As used herein, the term "software" or "program" signifies one or more algorithms and data structures that configure a processor for use in the innovations, embodiments and examples described in this specification. Such devices configurable by software include one or more computers, for example, standalone, client or server computers, or one or more hardware modules, or systems of one or more such computers or modules. As used herein, the term "software application" signifies a set of data and instructions that configure the processor to achieve a specific result, for example, to perform word processing operations, or to encrypt a set of data.

As used herein, the term "programming language" signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the "C" programming language or similar programming languages (such as SystemC), or object oriented programming language such as Smalltalk, C++ or the like, and any future equivalent programming languages.

Software is entered into, equivalently, read into, one or memories of the computer or computer system from a data and information storage device. The computer typically has a device for reading storage media that is used to transport the software, or has an interface device that receives the software over a network.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A unified formal property verification and fault injection system, comprising:
   a data store that stores a circuit design, formal property verification (FPV) properties for formally verifying functionality of the circuit design, and fault properties for evaluating whether injected faults are detected by the FPV properties; and
   a computer system in communication with the data store that is operative to, in a single user session:
      provide a first user interface for a user to select from the injected faults;
      run formal verification on the circuit design using the fault properties for selected faults to determine whether the FPV properties cover the selected faults, wherein the FPV properties cover a selected fault when the selected fault causes at least one of the FPV properties to evaluate to Falsified; and
      provide a second user interface to assist the user to analyze and debug fault coverage results of the formal verification.

2. The unified system of claim 1 wherein the first user interface allows the user to select and/or deselect individual faults, different classes of faults or different types of faults.

3. The unified system of claim 1 wherein the first user interface further allows the user to select from the FPV properties, and formal verification is run on the circuit design to determine whether the selected FPV properties cover the selected faults.

4. The unified system of claim 3 wherein the first user interface allows the user to select and/or deselect FPV properties by depth for which inconclusive FPV properties have been proven.

5. The unified system of claim 1 wherein, in the single user session, the computer system further:
   provides a fault view that lists and/or summarizes the injected faults; and
   updates the fault view to indicate progress of the formal verification.

6. The unified system of claim 1 wherein the fault coverage results classify the injected faults into statuses that include Non-detected, Non-activated, Detected, and Not-yet-qualified statuses.

7. The unified system of claim 1 wherein the fault coverage results classify the injected faults into statuses that include a Detected status; and the second user interface allows the user to debug source for faults that are not Detected.

8. The unified system of claim 1 wherein the fault coverage results classify the injected faults into statuses that include a Detected status; and the second user interface allows the user to analyze waveforms related to faults that are not Detected.

9. The unified system of claim 1 wherein the fault coverage results classify the injected faults into statuses that include a Detected status; and the second user interface allows the user to create new FPV properties and/or modify existing FPV properties to detect faults that are not Detected.

10. The unified system of claim 1 wherein the fault coverage results classify the injected faults into statuses that include a Detected status; and the second user interface allows the user to waive faults that are not Detected.

11. The unified system of claim 1 wherein the fault coverage results classify the injected faults into statuses that include a Detected status; and the second user interface allows the user to drill down into which FPV properties cover which Detected faults.

12. The unified system of claim 1 wherein, in the single user session, the computer system further:
   provides a fault view that lists and/or summarizes the injected faults; and
   the second user interface is accessible from the fault view.

13. The unified system of claim 1 wherein the second user interface allows the user to modify the FPV properties and/or the circuit design and, in the same single user session, the computer system is further operative to:
   rerun formal verification on the current circuit design to determine whether the FPV properties cover the selected faults.

14. The unified system of claim 1 wherein the computer system, prior to the single user session, is operative to:
   run formal verification on the circuit design using the FPV properties, wherein the FPV properties used in the single user session are selected based on results of said formal verification.

15. The unified system of claim 14 wherein the results of said formal verification classify the FPV properties into statuses that include Proven, Inconclusive and Falsified; and the FPV properties used in the single user session do not include Falsified FPV properties.

16. The unified system of claim 14 wherein the results of said formal verification classify the FPV properties into statuses that include Proven, Inconclusive and Falsified; and the FPV properties used in the single user session include Proven FPV properties.

17. The unified system of claim 14 wherein the results of said formal verification classify the FPV properties into statuses that include Proven, Inconclusive and Falsified; and the FPV properties used in the single user session include Inconclusive FPV properties up to a user-specified depth.

18. An EDA tool, comprising:
a data store that stores a circuit design, a set of formal property verification (FPV) properties for formally verifying functionality of the circuit design, and a set of fault properties for evaluating whether injected faults are detected by the set of FPV properties;
a computer system in communication with the data store, the computer system configured to perform formal property verification and to provide capabilities to debug fault coverage; and
a user interface that allows a user to select from the set of injected faults and to run formal verification on the circuit design using the fault properties for selected faults to determine fault coverage of the set of FPV properties, the set of FPV properties cover a selected fault when the selected fault causes at least one of the FPV properties to evaluate to Falsified, the fault coverage results displayed in the user interface as a fault view that lists and/or summarizes the injected faults and their fault coverage; wherein the user may launch the debug capabilities from the fault view.

19. The EDA tool of claim 18, wherein the computer system is further configured to perform fault injection; and the user interface further allows the user to modify the circuit design, the set of FPV properties, or the set of fault properties, wherein the user may launch the fault injection from the user interface to generate an updated set of fault properties based on the user's modifications.

20. A method for testing fault coverage of a formal verification on a circuit design, comprising:
storing, in the data store, the circuit design, formal property verification (FPV) properties for formally verifying functionality of the circuit design, and fault properties for evaluating whether injected faults are detected by the FPV properties;
providing, by a computer system in a user session, a first user interface for a user to select from the injected faults;
running, by the computer system, the formal verification on the circuit design using fault properties for selected faults to determine whether the FPV properties cover the selected faults, wherein the FPV properties cover a selected fault when the selected fault causes at least one of the FPV properties to evaluate to Falsified; and
providing, by the computer system in the user session, a second user interface to assist the user to analyze and debug fault coverage results of the formal verification.

* * * * *

UNITED STATES PATENT AND TRADEMARK OFFICE
CERTIFICATE OF CORRECTION

Page 1 of 1

PATENT NO. : 11,010,522 B2
APPLICATION NO. : 16/191241
DATED : May 18, 2021
INVENTOR(S) : Xiaolin Chen et al.

It is certified that error appears in the above-identified patent and that said Letters Patent is hereby corrected as shown below:

On the Title Page

Item (30): under foreign priority insert --Indian Provisional Application No. 201741040626, filed November 14, 2017--.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*